United States Patent [19]

Ruder

[11] 4,153,104

[45] May 8, 1979

[54] SOLAR HEATING AND COOLING SYSTEM

[75] Inventor: Carl J. Ruder, Overland Park, Kans.

[73] Assignee: Overland Energy, Inc., Shawnee Mission, Kans.

[21] Appl. No.: 831,515

[22] Filed: Sep. 8, 1977

[51] Int. Cl.² ............................................. F25B 29/00
[52] U.S. Cl. ...................................... 165/48 S; 62/2; 126/271; 237/1 A; 165/18
[58] Field of Search ................... 165/48, 14, 18; 62/2; 126/271; 237/1 A

[56] References Cited

U.S. PATENT DOCUMENTS

| | | | |
|---|---|---|---|
| 2,221,971 | 11/1940 | Haywood | 62/2 |
| 3,242,679 | 3/1966 | Puckett et al. | 62/2 |
| 3,931,806 | 1/1976 | Hayes | 165/18 |
| 4,007,776 | 2/1977 | Alkasab | 165/18 |
| 4,010,620 | 3/1977 | Telkes | 62/2 |
| 4,015,962 | 4/1977 | Tompkins | 62/2 |

*Primary Examiner*—Edgar W. Geoghegan
*Attorney, Agent, or Firm*—Thomas M. Freiburger

[57] ABSTRACT

A solar-energized heating and cooling system for a building utilizes solar heated water and a hot storage tank to provide space heating, to provide domestic hot water, and to operate absorption type refrigerating apparatus which cools water to be stored in a cold storage tank. When required, the stored cold water is used for space cooling. The domestic water subsystem utilizes the thermosiphon effect to maintain a tank of domestic hot water at substantially the temperature of the hot storage tank, without a pump. An emergency cooling system diverts circulating solar heated water through an outdoor heat radiator whenever water temperature becomes undesirably high. If hot water pressure becomes abnormally high or low, a water flush system directs source water through the solar collectors to a drain, to cool and stabilize pressure in the collectors. A logic system regulates valving and the operation of various equipment so that the changing heating and cooling needs of the building are accommodated automatically.

30 Claims, 2 Drawing Figures

SOLAR HEATING AND COOLING SYSTEM

BACKGROUND OF THE INVENTION

The invention relates to building heating and cooling and more particularly to a heating, cooling and hot water system utilizing solar energy.

A great many systems have been suggested for harnessing solar energy to heat and/or cool a building space, and to provide hot water for domestic use. Numerous such systems have used a liquid such as water as the medium for absorbing, transporting and storing heat.

Some of these prior systems have made use of absorption type cooling apparatus which is fired by solar-heated hot water. The cooling apparatus has in turn provided air conditioning for the building space. For example, a test townhouse installed by the National Bureau of Standards, U.S. Department of Commerce, at Gaithersburg, Md. utilizes such a system, with a hot water tank storing solar heated water for use in space heating, domestic water heating, or space cooling. The system is outlined in an April 1976 publication of the National Bureau of Standards entitled "Solar Energy".

U.S. Pat. Nos. 2,221,971 and 4,010,620 show absorption type cooling devices wherein solar energy at least in part provides heat for the absorption cycle. U.S. Pat. Nos. 3,242,679, 4,007,776 and 4,015,962 also show cooling utilizing solar energy.

Some of these prior solar energized systems have proven effective and some have not. In general they have not been structured to provide the efficient solar operated heating, cooling and domestic hot water provision of the present invention described below.

SUMMARY OF THE INVENTION

The present invention is a complete system for providing space heating and cooling and domestic hot water for a building, utilizing solar energy to the maximum extent possible. Liquid, preferably water, is circulated from a hot storage tank through solar collectors and returned to the tank. The well-insulated tank is capable of storing hot liquid for a relatively long period of time. When room heating is needed, hot liquid is drawn from the top of the tank and run through heat exchanger coils over which air is blown to heat the space. If the temperature of the stored liquid is not sufficiently high, an auxiliary electric heater in the line from the tank heats the liquid to the desired temperature level.

When room cooling is needed, hot liquid from the tank is directed through heat-operated refrigerating apparatus which cools liquid (again, preferably water) in another circulation system. The chilled water is pumped either directly through a heat exchanger coil for cooling the space, or into an insulated cold storage tank, from which it is pumped to the coil as needed. Again, the temperature of the hot liquid for operating the cooling apparatus may be boosted, if necessary, by the auxiliary electric heater.

A domestic hot water storage tank is positioned at a higher elevation than the hot storage tank, and a heat exchange coil is positioned in the hot tank, connected to the domestic tank in such a way that water is heated in the coil and circulates to the domestic tank by thermosiphonic action, without a pump. As hot water is drawn off the top of the tank, the volume is replenished by pressurized supply water connected in the thermosiphonic circulation loop upstream of the coil.

An emergency cooling system is included to prevent overheating of the solar collectors and to maintain a generally constant temperature level in the hot storage tank. When temperature in a line leading to the solar collectors becomes undesirably high, heated liquid downstream of the collectors is diverted through a radiator which dispenses heat to the outside air. Such elevated temperatures might occur, for example, when the supply of solar energy at the collectors is much greater than the demand.

An emergency flush system is also included. If pressure in the circulation loop including the collectors and the hot storage tank becomes abnormally high or low, indicating vaporization or a possible break in the collectors, or if a power failure stops the pump serving the collectors, this subsystem directs water from a water supply through the solar collectors to a drain, thereby cooling and protecting the collectors.

A logic system regulates valving and the operation of pumps, booster heaters and the refrigerating apparatus automatically, depending upon the changing needs of the building.

It is therefore among the objects of the invention to provide a solar-energized heating, air conditioning and hot water system for a building, utilizing solar energy to the maximum extent possible, with an efficient arrangement for liquid circulation involving a minimum of piping and pumps, and including automatically operating subsystems for preventing overheating and excessive pressures. These and other objects, advantages and features of the invention will be apparent from the following description of a preferred embodiment, taken in conjunction with the accompanying drawings.

DESCRIPTION OF THE PREFERRED EMBODIMENT

Figure 1:
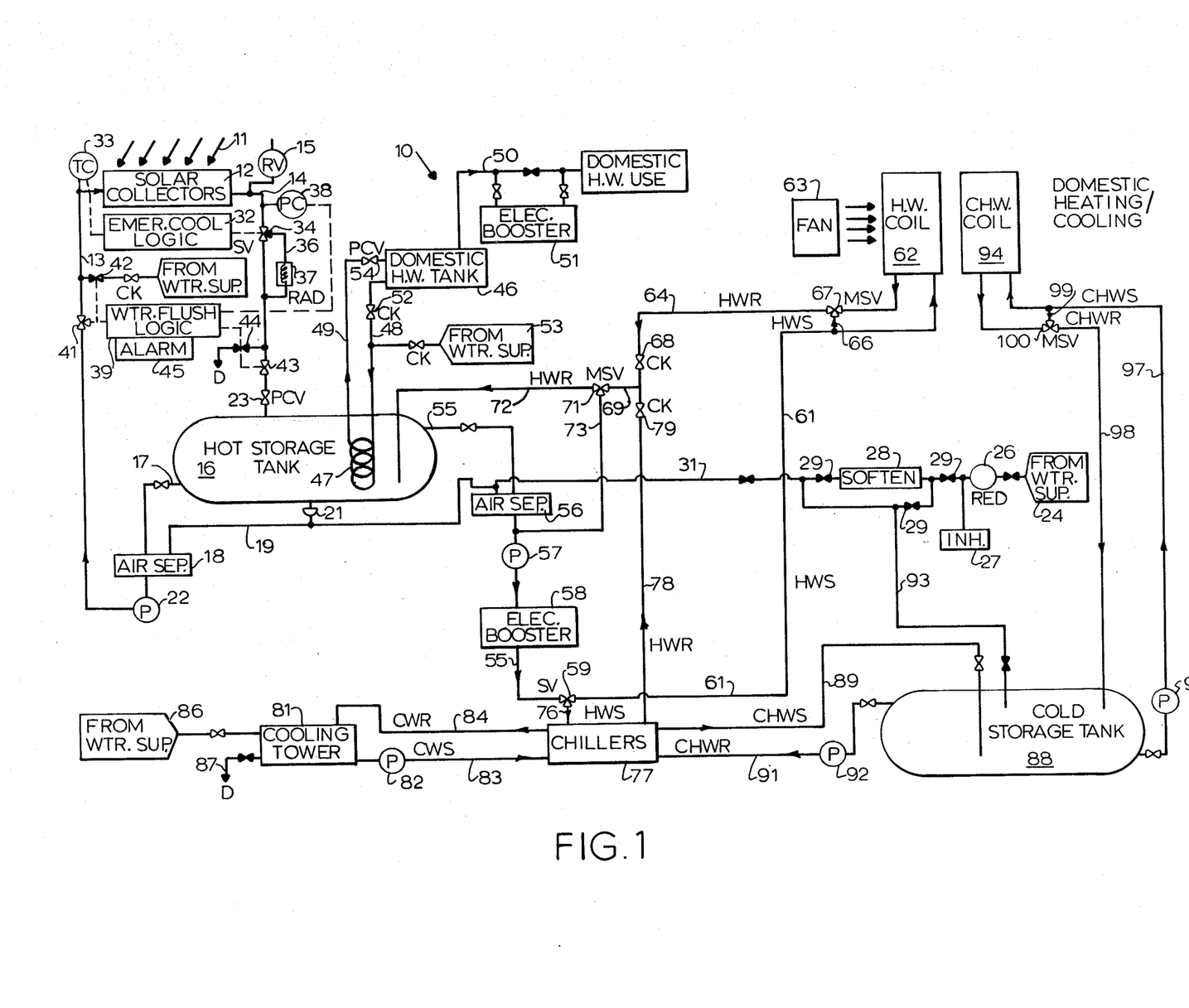
FIG. 1 is a diagrammatic view of a solar-energized heating, cooling and hot water system according to the invention, with many of the controls for the system omitted for clarity.

In the drawings, FIG. 1 shows a heating, air conditioning and domestic hot water system 10 in diagrammatic, somewhat simplified form. Solar rays 11 are indicated striking solar collectors 12, where they are absorbed as heat in liquid flowing through the collectors via inlet and outlet conduits 13 and 14, respectively. The solar collectors 12 may be any suitable, efficient type collectors, and may comprise, for example, collectors with shaped reflectors, both manufactured by Owens-Illinois, Inc. of Toledo, Ohio and sold under the trademark Sunpak.

The inlet and outlet liquid-carrying tubes 13 and 14 are part of a circulation circuit including the solar collectors and a hot liquid storage tank 16 which is either positioned underground or otherwise well insulated. The liquid, which is preferably water or water carrying rust and corrosion inhibitors, flows out of the tank through a line 17 preferably located near the tank bottom, where the stored hot liquid is coolest. From there it passes through an air separator 18 which removes from the water most of the entrained air which has been released by heating. Since the system is pressurized, the removed air is returned to the tank via a line 19 and a valve 21 which passes air but not liquid to the top of the hot storage tank.

Although, as discussed above, any suitable liquid may be used in any of the circulation systems herein, this description and the appended claims may at some points use the word "water" to refer to the liquid.

One or more pumps 22 circulate the liquid from the tank 16 through the line 13 and through the collectors 10 12, where it is heated. The heated liquid flows through the outlet line 14 to be returned to the hot storage tank 16 near the top, since this is the hottest liquid in the tank and the maintenance of thermal stratification is desirable for maximum efficiency. A pressure relief valve 15 may be positioned in the line 14 as a backup safety measure, set at a high relief pressure, although other means described below also guard against dangerously high pressures.

Pressure is established and maintained in this first liquid circulation system simply by the heating of the liquid, the entrained air and the air remaining in the tank 16 after initial filling. The tank is initially filled not quite full, and the resulting air and entrained air compress when heated, thereby exerting a pressure on the liquid in the system and enabling the liquid to reach higher temperatures without boiling, so that more heat can be stored in the liquid. Tank temperatures vary, but of course higher temperatures result in higher pressures, continuing to prevent vaporization of the liquid. A pressure control valve 23 just upstream of the tank maintains a preselected level of back pressure in the system upstream of the tank, thereby protecting the collectors. Pressure remains whether or not the pump 22 is operating.

The initial filling of the solar water circulation system is preferably in the evening, to avoid thermal shock to the solar collectors 12. When water is used as the circulating liquid, the filling is from a water supply outlet 24 which sends water through a pressure reducing device 26 and past a dispenser 27 of a rust inhibitor. From there the water may be softened, if it contains an undesirable concentration of hardening minerals, by a softener 28. Valves 29 are provided to either direct the water through the softener or bypass the softener. The water then flows through a line 31 to the vent line 19, from which it is introduced to the first circulation system through the air separator 18.

In the drawings space is conserved by the use of certain symbols. The symbol used for the valves 29 represents an ordinary on-off gate valve. Where this symbol is darkened the valve is normally closed. The same symbol with the notation "CK" indicates a check valve. A similar symbol with three arms, as in the valve 34 discussed below, indicates a three-way, or selector valve. The notation "SV" accompanies these valves. Again, if one outlet arm of such a valve is darkened, that arm is normally closed. Selector valves which modulate flow between two outlet arms in response to heating or cooling needs are accompanied by the notation "MSV", as in the valve 67 discussed below. The selector valves are preferably controlled automatically, as explained in connection with FIG. 2, but the simple gate valves may be either automatic or manual.

Several subsystems are associated with the first, or solar circulation system to prevent damage to the collectors 12 and other components under abnormal conditions. One subsystem provides for emergency cooling by radiating off some of the collected heat to the atmosphere, and the other flushes the collectors in the event an abnormal pressure condition is sensed.

The emergency cooling subsystem has a logic center 32 which initiates cooling of the solar heated liquid whenever, and so long as, a temperature-responsive control switch 33 indicates that liquid temperature in the inlet conduit 13 to the solar collectors is above a preselected ceiling operating temperature, preferably about 240° F. When this temperature is exceeded, the logic 32 switches a selector valve 34, which normally directs liquid straight down the line 14, to its emergency cooling position wherein it diverts all liquid through a cooling loop 36 including a radiator heat exchanger 37 positioned to give off heat to the outside atmosphere. The valve can be a proportioning selector valve (MSV) if desired, so that it diverts a variable portion of the water through the radiator 37 as dictated by temperature at the sensor 33, but a simple selector valve is sufficient for emergency cooling purposes.

The somewhat cooled liquid then flows into the hot storage tank in the normal manner. Cooling is discontinued by the logic center 32 when temperature at the sensor-switch 33 is again within limits.

The dashed lines in the drawings represent control lines (e.g. electrical wires) from the logic centers to control sensors and control valves.

The emergency water flushing subsystem includes a pressure sensing switch 38 sensitive to both abnormally high and abnormally low pressures in the solar circulation system just downstream of the collectors 12. An abnormally low pressure indicates that there might be a leak or a break in one or more of the collectors. This condition requires a water flushing to protect the collectors until the trouble can be investigated and repairs made. The flushing prevents the collectors from overheating until the condition is attended to. Abnormally high pressures could indicate boiling of solar heat fluid and consequent danger to the system, and again, a water flush protects the collectors and the remainder of the circuit until the condition is corrected. The flushing system is also activated if a power failure occurs and prevents operation of the solar circulation pump 22.

The pressure control switch 38 is connected to a water flush logic control center 39. When an abnormal pressure condition in the line 14 is sensed, or when a pump power failure occurs (the flush logic is connected to power and senses this condition), the flush logic closes a normally open valve 41 in the line 13 leading to the collectors, and opens a normally closed valve 42 from a water supply outlet, so that pressurized water from the building's water supply flows through the collectors 12. The flush logic 39 also closes a normally open valve 43 between the collectors and the hot storage tank, and opens a normally closed drain valve 44, so that the flush water is passed through the collectors at essentially atmospheric pressure and drained. An audible and/or visible alarm 45 is set off by the logic 39 whenever flushing occurs.

The flush logic center 39 and the valves under its control are preferably reset manually when the abnormal condition has been corrected. This may be accomplished, for example, by the manual tripping of a simple reset switch (not shown) associated with the flush logic center. The resetting may involve a delay in switching of the valves 43 and 44, if desired, sufficient to purge the collectors and circulation lines of the flush water. This might be desirable if the original circulating fluid is highly treated water, as by softening or addition of other additives besides a rust inhibitor, or if a liquid other than water is used. If the system is purged of the flush water, additional liquid should be added to bring back the volume, and this can be done as described above.

The solar water circulation pump 22 is preferably a centrifugal type pump, and thus may remain in operation when flow is interrupted for flushing of the collectors.

FIG. 1 shows a domestic hot water system connected into the hot storage tank 16 and including a domestic hot water tank 46, a coil 47 within the hot storage tank 16 connected to the domestic tank by circulation lines 48 and 49, and a line 50 leading to areas of domestic hot water use. The line 50 may be valved to pass through a booster heater 51 for increasing the water temperature during periods when insufficient solar energy is available or stored in the tank 16 to provide the desired temperature. The booster, which may be an electric resistance unit, for example, preferably is equipped to simply pass the water from the domestic tank 46 through to the use points without booster heating under the usual circumstances when solar heat storage is adequate, but to provide additional heating when and as needed, based on the temperature of the water reaching the booster apparatus (or based on the temperature in the domestic tank).

An important feature of the invention is the use of the thermosiphon principle to circulate water from the domestic tank 46 through the coil 47 and back to the tank. The domestic tank is located at a higher elevation than the hot storage tank, and the coil 47 is so arranged within the hot storage tank that the line 48, which comes from near the bottom of the domestic tank 46, connects to the bottom end of the coil, while the return line 49 connects to the top end of the coil and into the top of the domestic tank. Thus, the well known thermosiphon principle causes water in the coil, heated by the solar heated liquid, to rise in the line 49, and the cooler water in the line 48 to descend toward the bottom end of the coil. Constant circulation is thereby effected between the coil and the tank 46, without the use of a pump, and the temperatures of the two tanks tend to reach equilibrium. As hot water is drawn from the top of the tank 46 by domestic uses, the water volume is replenished by flow from a water supply outlet 53 which is under normal supply water pressure, as from a city water system, and which is open to the line 48. The supply water is thereby heated in the coil 47 before it passes into the tank 46.

As the temperature in the domestic hot water tank reaches its desired temperature limit (which may be lower than the hot storage tank temperature), a temperature control valve 54 restricts the flow between the two tanks. A check valve 52 may be additionally included, in the line 48 upstream of the supply outlet 53, to prevent backflow of water.

The water in the coil 47 and the line 49 does not vaporize, even though the hot storage tank temperature may exceed water's boiling point, because, the coil is under constant source water pressure (e.g., from a community system). Even when domestic use causes a pressure drop at that end of the system, the pressure in the coil remains sufficiently high to prevent vaporization, or "flashing".

For room heating, solar heated water exits the hot storage tank through a line 55 positioned near the top of the tank to draw off the hottest water. The line 55 passes through an air separator 56 similar to the air separator 18, then to a pump 57 which delivers water through a booster heater 58 toward the space to be heated. The booster heater 58 is similar to the domestic hot water booster 51, adding heat only as required, but is controlled by logic described with reference to FIG. 2.

From the line 55 downstream of the booster heater 58, the hot water is directed by a selector valve 59 into a room heating hot water supply line 61. ("HWS"). The selector valve 59, also controlled by logic indicated in FIG. 2, so directs the water whenever room heating is required. As will be explained later, this is the winter mode of the system.

The line 61 carries the hot water through room heating heat exchanger coils such as the coil 62 illustrated in FIG. 1. A fan 63 passes air over the coil to heat air directed to the space. The air may be heated (and cooled) at a single location, and ducted to and from the various locations to be served, or the hot (and cold) water may be piped to each location, with a coil at each location. Hot water cooled in the coils exits through a room hot water return line 64 ("HWR").

Provision is made for direct crossover of hot water from the supply line 61 to the return line 64, bypassing the coil 62. A bypass line 66 connects the lines via a modulating selector valve 67. This valve is controlled by system logic (FIG. 2), bypassing a variable portion of the hot water when the space has reached a desired temperature and it has been determined that only a certain portion of the hot water is required. A simple thermostat device in the logic effects this bypass regulation.

The returning water from the coil 62, from the bypass line 66, or both, passes through a check valve 68 and into a line 69, from which it is appropriately directed by a logic-controlled (logic to be discussed in connection with FIG. 2) modulating selector valve 71. The valve either directs all of the cooled return water through a return line 72 to the tank bottom, or it directs a variable portion of the return water through a line 73 to join the tank hot water outlet line 55 downstream of the air separator 56. The selective apportionment of the return water is made in order to obtain a desired temperature of hot water in the hot water supply line 61 leading to the room heating coil. In the winter mode the room heating water temperature is proportionally increased via such apportionment as outdoor air temperature decreases, so as to deliver water at approximately, but somewhat above, the temperature that is needed.

As further discussed below, if the hot storage tank temperature falls below that required to heat the space, the booster heater 58 is activated to the necessary extent, to produce the desired temperature, and no return water from the coil 62 is directed through the line 73.

The winter mode of the system, wherein room heating is required, is active only when outside air temperature is below a certain temperature which may vary according to the climate where the system is installed. When outside air exceeds this reference temperature, the system goes into a summer mode. Obviously the mode will change quite often, sometimes within the same day.

In the summer mode the hot water selector valve 59 is switched to direct all hot water through a line 76 to one or more absorption type water cooling units, or chillers 77. The hot water-fired chiller units may be lithium bromide-water units manufactured by Arkla Industries, Inc. of Evansville, Ind. The Arkla chillers include a component known as "generator" which utilizes heat from the incoming hot water (line 76) to produce a strong solution of lithium bromide, and cooling is produced through variation between weak and strong solutions, in a well known manner.

The hot water serving the chillers is cooled somewhat and is returned via a hot water return line 78, passing through a check valve 79 to the line 69. The modulating selector valve 71 operates in the same manner as described in connection with the winter mode to maintain a desired temperature of hot water supply to the chillers. In this case the desired temperature is constant, and for the type chillers described it is about 190° to 195° F. The modulating selector valve 71 thus introduces cooled hot water from the chillers back into the line 55, mixing with the flow of water from the hot tank to produce the desired temperature. Again, if the hot storage tank is not hot enough to serve the chillers, the booster heater 58 raises the temperature of the water to the required level.

The chillers 77 also require some form of cooling to remove heat. This may be provided by condenser cooling, as, for example, in a cooling tower 81. If the cooling tower 81 is used, a pump 82 delivers cooled water from the cooling tower through a cold water supply line 83, and the warmed water is returned to the cooling tower through a cold water return line 84. Water is added to the cooling tower as required from a water supply outlet 86, and the tower also includes a normally closed drain line 87.

The chillers 77 cool water or other liquid circulating to and from a cold storage tank 88 via chilled water supply and return lines 89 and 91, and a chiller pump 92. The colder water is introduced to the bottom of the tank as indicated, and the return water is drawn from the top, in order to maintain temperature stratification. The chillers maintain the cold storage tank water in a predetermined temperature range which may be about 45° to 48° F. Water is initially supplied to the cold tank 88 through a line 93 leading ultimately from the water supply outlet 24. As indicated, the water may be treated in the same way as in the case of the solar circulating water fed into the hot storage tank 16.

The cold storage tank 88 supplies chilled water to a chilled water heat exchanger coil 94 over which air is blown by the fan 63 to cool the space during the summer mode. As indicated above, one cooling coil or a number of separately located coils may be provided. Also, at each location of coils, a single heat exchanger coil may be used for both heating and cooling if desired, rather than the separate coils shown and described herein. This may be advantageous when a coil is provided at each location rather than one coil at a central location, in that a considerable amount of piping can be saved. This modification is discussed further below with reference to FIG. 2.

A chilled water pump 96 delivers chilled water from near the bottom of the tank 88 through a chilled water supply line 97 to the coil 94, and warmed water is returned to the top of the tank through a chilled water return line 98. As in the case of the hot water coil 62, a bypass line 99 and modulating selector valve 100 are included to bypass a variable portion of the chilled water back to the tank, without passing through the coil 94, as room temperature conditions dictate.

Figure 2:
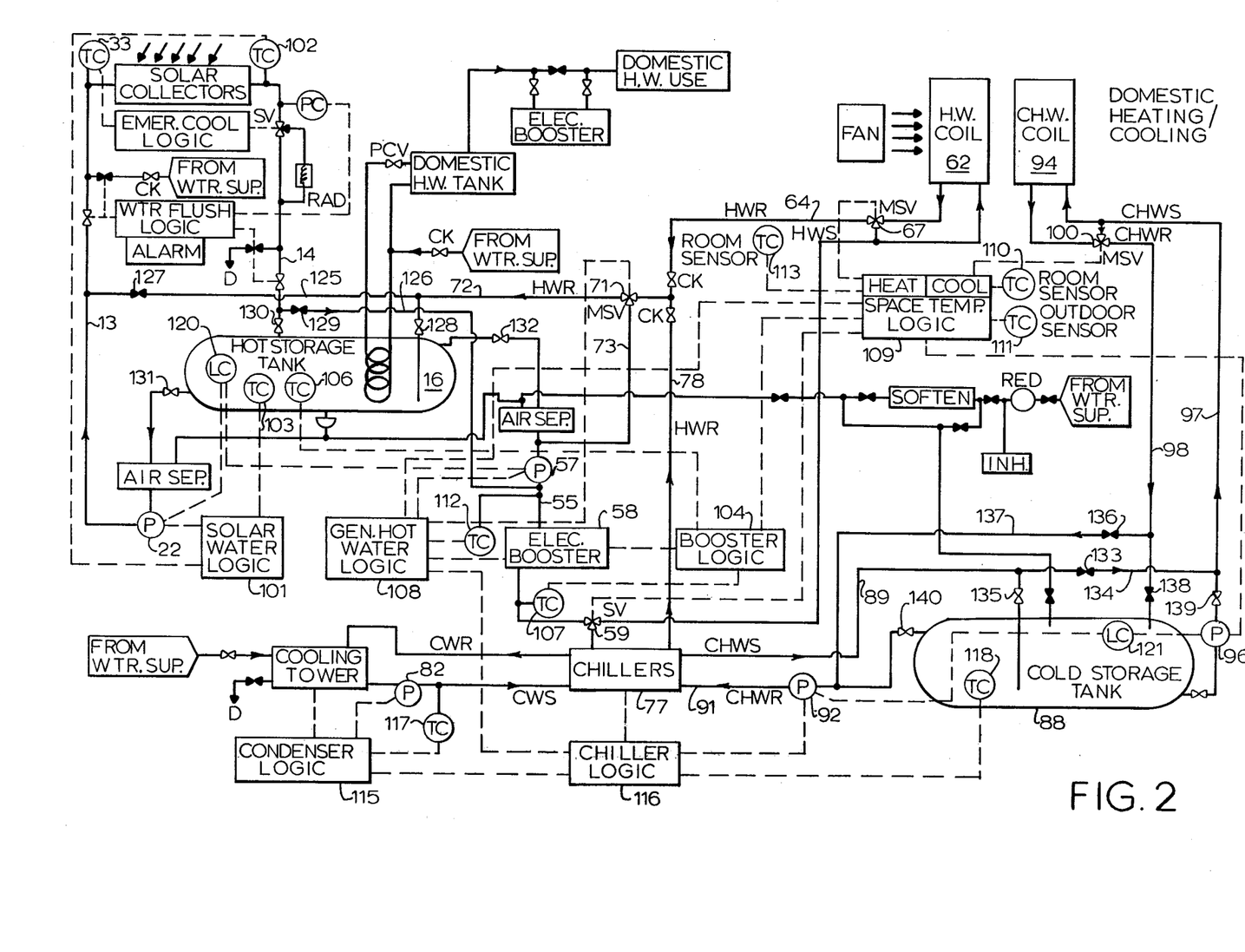
FIG. 2 is a diagrammatic view similar to FIG. 1 but indicating control or logic subsystems serving the system.

Logic and further operational sequencing of the system are explained with reference to FIG. 2, which is similar to FIG. 1 but with much additional matter shown diagrammatically. Many of the reference numbers and some features of the system are omitted in FIG. 2 because of limited space, but the skeletal FIG. 1 can be referred to for this omitted matter.

As discussed previously, dashed lines represent electrical or other type (e.g., pneumatic) control connections between and among sensors, logic control apparatus, solenoid or other remote controlled valves, and pumps. The logic control apparatus all comprises conventional and well known equipment, and will not be described herein except as to function.

Solar Circulation System

When the solar collectors are heated by the sun to a temperature greater than the fluid stored in the pressurized hot storage tank, a differential temperature comparator of a solar water logic center 101 determines this by comparing temperature at a sensor 102 downstream of the collectors and a sensor 103 in the hot storage tank. The logic then initiates the solar water pump 22 to start and circulate fluid from the bottom of the tank up through the collectors to be heated and returned to the top of the tank. When cloud cover or nightfall prevents the collectors from gaining heat, the differential temperature comparator determines that the temperature at the collectors is the same as or less than the temperature in the tank, and shuts the solar water pump 22 off until solar energy is available again.

Generator Hot Water and Space Temperature Logic System

As discussed above, the purpose of the generator hot water system is to take the solar heated water from the hot storage tank and distribute it to the chillers 77 in the summer (or summer mode) and the air handling unit hot water heating coil 62 in the winter (or winter mode).

In the summer mode the generator hot water pump 57 is started and stopped in conjunction with the chillers start-stop. In the event that the temperature in the hot water delivery line 55 falls below the required temperature, as determined by a temperature sensor 112 in the line, a generator hot water logic center 108 causes the modulating selector valve 71 to return all water to the tank, through the line 72. When this condition occurs, the generator hot water logic 108 also causes booster logic 104 to start the auxiliary booster heater 58. The booster 108 is controlled by the booster logic to maintain the required temperature, as determined at a downstream temperature sensor 107. This continues until the hot storage tank temperature increases to the pre-set desired temperature (of a temperature a few degrees above that temperature) where auxiliary heat is not required, as determined by a tank temperature sensor 106. At this time the booster is shut off by the booster logic, and the generator water heat is again provided exclusively from the hot storage tank. The pre-set minimum temperature for water in the line 55 may be, for example, about 190° F., with the tank sensor 106 set at about 200° F.

As long as the hot storage tank temperature is at or above the desired preselected minimum with no need for booster heating as discussed previously, the modulating selector valve 71 diverts a variable portion of the returning hot water from the line 78 (or the hot coil return line 64, in the winter mode) through the line 73 to bypass the tank and blend with hot water from the tank to provide the desired temperature for delivery to the chillers (or the hot coil 62 in winter mode). The modulation of the valve 71 is controlled by the generator hot water logic center 108 which determines temperature in the hot water delivery line 55 via the sensor 112 upstream of the booster heater but downstream of the entry of the bypass line 73. In the summer mode this function is simple: a specified temperature (about 190° F. to 195° F.) is required to operate the chillers most efficiently, and the logic 108 blends return water accordingly with solar heated hot tank water, which is at a higher temperature than the chillers require.

In the summer mode the modulating selector valve 100, which regulates the flow of bypass cooling water in response to room cooling needs, is controlled by a space temperature logic center 109. In this function the space logic 109 functions as a simple thermostat, sensing room temperature via a sensor 110 and controlling the valve 100 accordingly. On complete bypass of chilled water around the coil when room cooling requirements are satisfied, the chilled water pump 96 is stopped and will not start for a predetermined amount of time regardless of the space requirements. This is controlled by the space temperature logic 109, which of course senses the condition requiring complete bypass. After the predetermined time interval has elapsed, if the space logic is calling for cooling, the chilled water pump 96 will be started again by the logic 109 to circulate water through the cooling coil.

In the winter mode, the hot liquid from the hot storage tank, which may or may not be further heated by the booster 58, is diverted by the selector valve 59 from the chillers to the air handling unit hot water heating coil 62. The mode selector valve 59 is controlled by the space temperature logic 109, which selects a summer or winter mode merely on the basis of outdoor temperature, determined by an outdoor sensor 111. The cutoff temperature may be, for example, about 60° F.

The room heating modulating selector valve 67 is controlled by the space logic 109 in the same manner as the cooling valve 100 is controlled, with a sensor 113 furnishing room temperature information. Hot water is bypassed from the heating coil as the space heating requirements become satisfied, and on complete bypass around the coil the generator hot water pump 57 is stopped and will not start for a predetermined period of time regardless of the space requirements. When the complete bypass condition occurs the space temperature logic 109 sends a signal to the generator hot water logic 108, which in turn shuts off the pump 57 for the predetermined time period. After this time has elapsed, if the space logic is calling for heat, the generator hot water pump 57 will start and begin circulating water through the heating coil again. The hot water leaving the heating coil is returned back to the hot storage tank through the modulating selector valve 71 which proportionally diverts fluid back to the generator pump 57 and/or to the bottom of the hot storage tank to maintain a hot water supply temperature that is proportionally increased as the outdoor air temperature decreases. E.g., if the outdoor sensor 111 senses an outdoor temperature of 50° F., the space logic 109 sends an appropriate signal to the generator hot water logic 108, which in turn will control the modulating valve 71 to maintain supply water at a temperature of, say 100° F. An outdoor temperature of 30° may dictate 140° supply water, and 0° outdoor may require 200° water.

As the temperature in the hot storage tank falls below the required temperature to heat the facility, as determined by the line sensor 112, the outdoor sensor 111, the logic 108 and the booster logic 104, the booster heater 58 is started and controlled by the booster logic 104 to maintain the required temperature until such time as the hot water storage temperature increases to a temperature where auxiliary heat is not required (or a temperature a few degrees thereabove), as determined by the tank temperature sensor 106 and the booster 108 or 104 (when the booster is in operation, the booster logic determines the desired water temperature on the basis of outside temperature, as does the generator hot water logic 108 when the booster is not in operation). The booster is then shut off, and the generator water heat is again provided exclusively from the hot storage tank.

As mentioned above, the heating and cooling coils 62 and 94 may in some situations be advantageously replaced by a single heat exchanger coil at each location for both heating and cooling, with only one pair of liquid conduits leading thereto from the hot and cold water supplies. This would require an additional pair of selector valves (not shown) for selecting between hot and cold supply and return for the piping. However, only one modulating selector valve 67 or 100 would be needed for room temperature control, and this could be appropriately controlled by the space temperature logic on the basis of summer or winter mode.

Condenser Water System

When the chillers 77 are operating, the condenser water pump 82 is started by condenser logic 115, which is connected to chiller logic 116 (see below). The pump 82 circulates water from the bottom of the cooling tower basin through the chillers to provide condensing water and absorber cooling water. The warmer condensing water leaves the chillers and is circulated to the top of the cooling tower where it is cooled by evaporation and circulated back to the chillers. The cooling tower fan is started when the condenser water temperature at a sensor 117 rises above a specified setting and is shut off when the temperature falls below that setting.

Chiller System

In the summer mode, when the temperature of the liquid in the cold storage tank 88 rises above a preselected temperature, as determined by a sensor 118 in the tank, the chiller logic 116 starts the chiller pump 92, the chillers 77, the condenser water system (through the condenser logic 115) and the generator hot water system (through the generator logic 108). This means that the generator logic activates the pump 57, controls the diverting temperature-control valve 71, and calls for booster heating as necessary. The chillers continue to run until the temperature in the cold storage tank falls below the pre-set temperature, at which point the chiller system is deactivated, shutting-off the chiller pump, the chillers, the condenser water system and the generator hot water system.

Level Control

The system of the invention also includes level control apparatus which acts to prevent damage to the system if the liquid level in either the hot storage tank or the cold storage tank should for some reason fall below a safe level. In the hot storage tank a level sensor 120 shuts off the solar circulation pump 22 and the generator hot water pump 57 if the required level in the tank fails to be maintained. Similarly, a level sensor 121 in the cold storage tank shuts off the chiller pump 92 and the chilled water circulation pump 96 if the level falls below the required minimum.

The system of the invention may include additional valving and piping for bypassing the hot storage tank and/or the cold storage tank and feeding the heated or chilled liquid directly to the use point. The bypass equipment is primarily for experimental determination of whether, in a given climate, it may be more efficient to bypass hot or cold water under certain conditions.

Such bypass equipment is exemplified at the hot storage tank 16 by a bypass line 125 from the hot water return line 72 to the solar circulation inlet line 13, and by a line 126 leading from the solar heated water outlet line 14, just above the tank, to the line 55 downstream of the generator hot water pump 57. A normally closed valve 127 in the pypass line 125 may be opened, and a normally open valve 128 in the return line 72 just outside the tank may be closed, so that returning hot water from the hot water coil 62 or the chillers 77 may be routed directly back to the solar collectors, without entering the tank 16. Water heated in the solar collectors may be directed through the line 126, bypassing the tank, by opening a normally closed valve 129 and closing a normally open valve 130. Tank outlet valves 131 and 132 should also be closed. This causes the solar pump 22 to act as a hot water delivery pump as well as a solar circulating pump. The generator hot water logic 108 can be adjusted to inactivate the pump 57, except as required for handling return water from the line 73, with the logic remaining in control of the modulating temperature control valve 71. The logic would continue to provide booster heat as necessary, based on temperature at the sensor 109 rather than in the tank.

The cold storage tank 88 can be similarly bypassed under conditions where bypassing is advantageous, such as when the full output of the chillers 77 is needed to cool the space. Bypassing can be accomplished by opening a valve 133 in a line 134 leading from the chilled water supply line 89 to the chilled water delivery line 97, while closing a tank inlet valve 135. On the return, a valve 136 is opened in a line 137 leading from the coil return line 98 to the chiller return line 91. Valves 138, 139 and 140 should be closed. The chilled water pump 96 is thus valved off, with the chiller pump 92 being relied upon for circulation through the chillers and the coil 94. The logic can be adjusted accordingly, with a connection between the chiller logic 116 and the logic 109 necessary since the chillers will operate in response to space needs rather than tank needs.

The above described preferred embodiment provides a solar heating, cooling and hot water system which derives maximum heating and cooling benefit from solar collectors by an efficient arrangement of pumps, conduits and valves and by optimum handling of heating and cooling fluid by logic centers. The system also includes a novel domestic hot water subsystem and automatic safety devices including emergency collector cooling and emergency flushing. Various other embodiments and modifications of this preferred embodiment will be apparent to those skilled in the art and may be made without departing from the spirit and scope of the invention as defined by the following claims.

I claim:
1. A solar-energized system for heating, cooling and supplying domestic hot water for a building space, comprising:
  a hot liquid storage tank;
  means for collecting solar energy as heat and transferring the heat to flowing liquid;
  first liquid circulation means directing liquid from the hot storage tank through the solar energy collecting means and returning the heated liquid to the hot storage tank;
  a cold liquid storage tank;
  chiller means operable on heat from a hot liquid stream, for cooling a second liquid stream;
  second circulation means for circulating hot liquid from the hot storage tank to the chiller means, as said hot liquid stream, and returning it to the hot storage tank;
  third circulation means for circulating liquid from the cold storage tank to the chiller means as said second liquid stream and returning the chilled liquid to the cold storage tank;
  at least one heat exchanger and blower means for passing air over the heat exchanger to supply heating and cooling to the building space;
  fourth circulation means for circulating hot liquid when required from the hot storage tank to the heat exchanger and returning it to the hot storage tank;
  fifth circulation means for circulating chilled liquid when required from the cold storage tank to the heat exchanger and returning it to the cold storage tank; and
  a domestic hot water system including a domestic hot water tank, a heat exchanger coil positioned within the hot liquid storage tank, conduits connecting the domestic hot water tank with each end of the coil, means for circulating water from the domestic tank through the coil when heating is required, means supplying source water when required to the conduit upstream of the coil, and a conduit near the upper end of the domestic tank for drawing off heated water for domestic use.

2. The system of claim 1 wherein said means in the domestic hot water system for circulating water from the tank through the coil comprises the location of the hot water tank at a higher elevation than that of the hot liquid storage tank, the conduit upstream of the coil being connected near the lower end of the domestic tank and extending into the hot liquid storage tank, the coil communicating with the lower end of said upstream conduit and being located substantially entirely above the lowest point of said upstream conduit and being connected at its upper end to a downstream conduit, and said downstream conduit being connected near the upper end of the domestic tank, whereby, when the water temperature of the domestic tank is lower than the temperature of the hot liquid in the hot liquid storage tank surrounding the coil, water heated in the coil will tend to flow upwardly through the downstream conduit to the domestic tank, thereby causing circulation and tending to equalize the temperatures of the water in the domestic tank and the hot liquid in the hot liquid storage tank.

3. The system of claim 1 which further includes emergency means for cooling solar heated liquid when it reaches a predetermined temperature, thereby tending to maintain consistency in hot liquid storage temperature and preventing overheating of the solar collecting means.

4. The system of claim 3 wherein said emergency cooling means comprises a heat radiator positioned outside the building space and within a conduit loop connected into said first circulation means downstream of the solar collecting means, and a selector valve in said first circulation means for routing at least a part of the flow of solar heated liquid through the radiator when said predetermined temperature is reached.

5. The system of claim 4, including a temperature sensor in said first circulation between the hot storage tank and the solar collecting means, upstream of the solar collecting means, and means connected to the sensor for causing said selector valve to route solar heated liquid through the radiator so long as the liquid temperature at the sensor remains as high as said predetermined temperature.

6. The system of claim 1 which further includes means for flushing the solar collecting means with water when the pressure in said first circulation means falls outside a predetermined range.

7. The system of claim 6 wherein said water flushing means includes a pressure sensor in said first circulation means, a pressurized water source leading through a flush conduit to the first circulation means upstream of the solar collecting means, a first normally closed valve in the flush conduit, a normally open second valve in the first circulation means upstream of the flush conduit, a drain line connected to the first circulation means downstream of the solar collecting means, a normally closed third valve in the drain line, a normally open fourth valve in the first circulation means downstream of the drain line, and logic means for opening the first valve, closing the second valve, opening the third valve and closing the fourth valve when said pressure sensor senses a pressure outside said predetermined range.

8. The system of claim 1 which further includes valved bypass conduit means extending between said third and fifth circulation means for circulating cold liquid directly from the chiller means to the cooling coil, by passing the cold liquid storage tank.

9. The system of claim 1 which further includes means for bypassing around the hot liquid storage tank a variable portion of the return liquid in said fourth circulation means, in order to maintain the liquid en route to the heat exchanger at a preselected temperature, when space heating is required and the hot storage tank temperature is above said preselected temperature.

10. The system of claim 9 which further includes logic means for selecting said preselected temperature on the basis of outdoor temperature, said preselected temperature being higher for lower outdoor temperatures.

11. The system of claim 10 wherein said preselected temperature is higher than that required to heat the space, and further including means in said fourth circulation means for bypassing a variable portion of the hot liquid around the heat exchanger in response to the heating needs of the space.

12. The system of claim 9 which further includes a booster heater in said fourth circulation means and means for activating the booster heater to raise the temperature of the liquid from the hot liquid storage tank, en route to the heat exchanger, to said preselected temperature when required.

13. A system for heating, cooling and supplying hot water for a building space using solar heat, comprising:
   a hot water storage tank;
   solar collectors having means for collecting solar heat energy and transferring the heat to flowing water;
   first circulation means connected to the solar collectors and to the hot water storage tank, for circulating water from the tank to the collectors and returning the heated water to the tank;
   hot-water-fired chiller means for cooling a stream of water flowing therethrough;
   second circulation means connected to the hot storage tank and to the chiller means for supplying hot water when required to the chiller means and returning it to the tank;
   at least one heat exchanger means and blower means for passing air over the heat exchanger means to supply heating and cooling to the building space;
   third circulation means connected to the chiller means and to the heat exchanger means for circulating chilled water when required from the chiller means to the heat exchanger means and returning it to the chiller means, as said stream of water;
   fourth circulation means connected to the hot storage tank and to the heat exchanger means for circulating hot water when required from the hot storage tank to the heat exchanger means and returning it to the hot storage tank;
   a domestic hot water system including a domestic hot water tank, a heat exchanger coil positioned within the hot water storage tank, conduits connecting the domestic hot water tank with each end of the coil, means for circulating water from the domestic tank through the coil when heating is required, means supplying source water when required to the conduit upstream of the coil, and a conduit near the upper end of the domestic tank for drawing off heated water for domestic use;
   emergency cooling means for cooling solar heated water when it reaches a predetermined temperature, thereby tending to maintain consistency in hot water storage temperature and preventing overheating of the solar collectors.

14. The system of claim 13 wherein said emergency cooling means comprises a heat radiator positioned outside the building space and within a conduit loop connected into said first circulation means downstream of the solar collecting means, and a selector valve in said first circulation means for routing at least a part of the flow of solar heated liquid through the radiator when said predetermined temperature is reached.

15. The system of claim 13 which further includes means for flushing the solar collecting means with water when the pressure in said first circulation means falls outside a predetermined range.

16. The system of claim 15 wherein said water flushing means includes a pressure sensor in said first circulation means, a pressurized water source leading through a flush conduit to the first circulation means upstream of the solar collectors, a first normally closed valve in the flush conduit, a normally open second valve in the first circulation means upstream of the flush conduit, a drain line connected to the first circulation means downstream of the solar collectors, a normally closed third valve in the drain line, a normally open fourth valve in the first circulation means downstream of the drain line, and logic means for opening the first valve, closing the second valve, opening the third valve and closing the fourth valve when said pressure sensor senses a pressure outside said predetermined range.

17. The system of claim 13 wherein said means in the domestic hot water system for circulating water from the tank through the coil comprises the location of the hot water tank at a higher elevation than that of the hot water storage tank, the conduit upstream of the coil being connected near the lower end of the domestic tank and extending into the hot water storage tank, the coil communicating with the lower end of said upstream conduit and being located substantially entirely above the lowest point of said upstream conduit and being connected at its upper end to a downstream conduit, and said downstream conduit being connected near the upper end of the domestic tank, whereby, when the water temperature of the domestic tank is lower than the temperature of the hot water in the hot water storage tank surrounding the coil, water heated in the coil will tend to flow upwardly through the downstream conduit to the domestic tank, thereby causing circulation and tending to equalize the temperatures of the water in the domestic tank and the hot water in the hot water storage tank.

18. The system of claim 13 which further includes means associated with said second and fourth circulation means for bypassing around the hot water storage tank a variable portion of the return water of whichever of said second and fourth circulation means is in operation, in order to maintain the water being delivered at a preselected temperature, when the hot water storage tank temperature is above said preselected temperature.

19. The system of claim 18 which further includes logic means for selecting, when space heating is required, said preselected temperature on the basis of outdoor temperature, said preselected temperature being higher for lower outdoor temperatures.

20. The system of claim 18 which further includes a booster heater associated with said second and fourth circulation means and means for activating the booster heater to raise the temperature of the water being delivered from the hot water storage tank to said preselected temperature when required.

21. A system for heating and cooling a building space using solar heat, comprising:
 a hot water storage tank;
 solar collectors having means for collecting solar heat energy and transferring the heat to flowing water;
 first circulation means connected to the solar collectors and to the hot water storage tank, for circulating water from the tank to the collectors and returning the heated water to the tank;
 hot-water-fired chiller means for cooling a stream of water flowing therethrough;
 second circulation means connected to the hot storage tank and to the chiller means for supplying hot water when required to the chiller means and returning it to the tank;
 at least one heat exchanger means for supplying heating and cooling to the building space;
 third circulation means for circulating chilled water from the chiller means through the heat exchanger means when space cooling is required;
 fourth circulation means connected to the hot storage tank and to the heat exchanger means for circulating hot water when required from the hot storage tank to the heat exchanger means and returning it to the hot storage tank; and
 means associated with said second and fourth circulation means for bypassing around the hot water storage tank a variable portion of the return water of whichever of said second and fourth circulation means is in operation, in order to maintain the water being delivered at a preselected temperature, when the hot water storage tank temperature is above said preselected temperature.

22. The system of claim 21 which further includes logic means for selecting, when space heating is required, said preselected temperature on the basis of outdoor temperature, said preselected temperature being higher for lower outdoor temperatures.

23. The system of claim 22 wherein said preselected temperature, when space heating is required, is higher than that required to heat the space, and further including means in said fourth circulation means for bypassing a variable portion of the hot water around the heat exchanger in response to the heating needs of the space.

24. The system of claim 23 which further includes means for stopping said fourth circulation means for a predetermined time period when complete bypass of hot water around the heat exchanger means is called for by said hot water bypassing means.

25. The system of claim 23 which further includes, when space cooling is required, means for bypassing a variable portion of the chilled water around the heat exchanger in response to the cooling needs of the space.

26. The system of claim 25 which further includes means for stopping said third circulation means for a predetermined time period when complete bypass of chilled water is called for by said chilled water bypassing means.

27. The system of claim 26 which further includes means for stopping said fourth circulation means for a predetermined time period when complete bypass of hot water around the heat exchanger means is called for by said hot water bypassing means.

28. The system of claim 21 which further includes a booster heater associated with said second and fourth circulation means, and means for activating the booster heater to raise the temperature of the liquid being delivered from the hot water storage tank to said preselected temperature when required.

29. The system of claim 21 which further includes means associated with said third and fourth circulation means for bypassing a variable portion of the water of whichever of said third and fourth circulation means is in operation, around the heat exchanger in response to the cooling or heating needs of the space.

30. The system of claim 29 which further includes stopping the operation of one of said third and fourth circulation means for a predetermined time period when complete bypass is called for by said heat exchanger bypassing means.

* * * * *